(12) United States Patent
Lee et al.

(10) Patent No.: US 10,928,572 B2
(45) Date of Patent: Feb. 23, 2021

(54) METHOD FOR PRODUCING POLARIZING PLATE AND POLARIZING PLATE

(71) Applicant: LG CHEM, LTD., Seoul (KR)

(72) Inventors: Byung Sun Lee, Daejeon (KR); Sung Hyun Nam, Daejeon (KR); Kyun Il Rah, Daejeon (KR)

(73) Assignee: LG Chem, Ltd.

( * ) Notice: Subject to any disclaimer, the term of this patent is extended or adjusted under 35 U.S.C. 154(b) by 122 days.

(21) Appl. No.: 15/103,614

(22) PCT Filed: Jun. 24, 2015

(86) PCT No.: PCT/KR2015/006423
§ 371 (c)(1),
(2) Date: Jun. 10, 2016

(87) PCT Pub. No.: WO2016/003107
PCT Pub. Date: Jan. 7, 2016

(65) Prior Publication Data
US 2016/0313480 A1 Oct. 27, 2016

(30) Foreign Application Priority Data

Jun. 30, 2014 (KR) .................... 10-2014-0080490
Sep. 26, 2014 (KR) .................... 10-2014-0129209

(51) Int. Cl.
*G02B 5/30* (2006.01)
*B29D 11/00* (2006.01)
(Continued)

(52) U.S. Cl.
CPC ........ *G02B 5/305* (2013.01); *B29D 11/00644* (2013.01); *B29D 11/00865* (2013.01);
(Continued)

(58) Field of Classification Search
CPC . G02B 5/305; G02B 1/14; G02B 1/11; G02B 5/3083; B29D 11/00644;
(Continued)

(56) References Cited

U.S. PATENT DOCUMENTS 4,181,756 A  1/1980 Fergason
4,396,646 A  8/1983 Schuler et al.
(Continued)

FOREIGN PATENT DOCUMENTS

CN  102609038 A  7/2012
EP  2447766 A1  5/2012
(Continued)

OTHER PUBLICATIONS

Office Action of the U.S. Patent Office in U.S. Appl. No. 15/105,938, dated Nov. 1, 2017.
(Continued)

*Primary Examiner* — Thomas K Pham
*Assistant Examiner* — Mitchell T Oestreich
(74) *Attorney, Agent, or Firm* — Lerner, David, Littenberg, Krumholz & Mentlik, LLP

(57) ABSTRACT

The present specification relates to a method for manufacturing a polarizing plate and a polarizing plate. More particularly, the present specification relates to a method for manufacturing a polarizing plate locally having a depolarization region, and a polarizing plate.

20 Claims, 6 Drawing Sheets
(6 of 6 Drawing Sheet(s) Filed in Color)

(51) Int. Cl.

| | | |
|---|---|---|
| *B32B 7/06* | (2019.01) | |
| *B32B 27/08* | (2006.01) | |
| *B32B 27/28* | (2006.01) | |
| *B32B 27/30* | (2006.01) | |
| *B32B 27/32* | (2006.01) | |
| *B32B 27/36* | (2006.01) | |
| *B32B 27/40* | (2006.01) | |
| *G02F 1/1335* | (2006.01) | |
| *G02B 1/14* | (2015.01) | |
| *B32B 7/12* | (2006.01) | |
| *G02B 1/11* | (2015.01) | |
| *B29K 629/00* | (2006.01) | |

(52) U.S. Cl.
CPC ......... *B29D 11/00894* (2013.01); *B32B 7/06* (2013.01); *B32B 7/12* (2013.01); *B32B 27/08* (2013.01); *B32B 27/28* (2013.01); *B32B 27/30* (2013.01); *B32B 27/306* (2013.01); *B32B 27/308* (2013.01); *B32B 27/32* (2013.01); *B32B 27/325* (2013.01); *B32B 27/36* (2013.01); *B32B 27/365* (2013.01); *B32B 27/40* (2013.01); *G02B 1/11* (2013.01); *G02B 1/14* (2015.01); *G02B 5/3083* (2013.01); *G02F 1/133528* (2013.01); *G02F 1/133533* (2013.01); *B29K 2629/04* (2013.01); *B29K 2995/002* (2013.01); *B29K 2995/0034* (2013.01); *B29K 2995/0077* (2013.01); *B32B 2260/02* (2013.01); *B32B 2260/04* (2013.01); *B32B 2307/308* (2013.01); *B32B 2307/402* (2013.01); *B32B 2307/412* (2013.01); *B32B 2307/42* (2013.01); *B32B 2307/50* (2013.01); *B32B 2307/516* (2013.01); *B32B 2307/518* (2013.01); *B32B 2307/538* (2013.01); *B32B 2307/54* (2013.01); *B32B 2307/732* (2013.01); *B32B 2307/75* (2013.01); *B32B 2329/04* (2013.01); *B32B 2457/20* (2013.01); *B32B 2457/202* (2013.01); *B32B 2551/00* (2013.01)

(58) Field of Classification Search
CPC ........ B29D 11/00865; B29D 11/00894; B32B 7/06; B32B 7/12; B32B 7/08; B32B 7/28; B32B 7/30; B32B 7/306; B32B 7/308; B32B 7/32; B32B 7/325; B32B 7/36; B32B 7/365; B32B 7/40; B32B 2260/02; B32B 2260/04; B32B 2307/308; B32B 2307/402; B32B 2307/412; B32B 2307/42; B32B 2307/50; B32B 2307/516; B32B 2307/518; B32B 2307/538; B32B 2307/54; B32B 2307/732; B32B 2307/75; B32B 2329/04; B32B 2457/20; B32B 2457/202; B32B 2551/00; G02F 1/133528; G02F 1/133533; B29K 2629/04; B29K 2995/0034; B29K 2995/0077

USPC .......................................................... 359/486
See application file for complete search history.

(56) References Cited

U.S. PATENT DOCUMENTS

| | | |
|---|---|---|
| 9,341,758 B2 | 5/2016 | Matsuda et al. |
| 10,009,525 B2 | 6/2018 | Mathew et al. |
| 2002/0054261 A1 | 5/2002 | Sekiguchi |
| 2012/0105400 A1 | 5/2012 | Mathew et al. |
| 2012/0106063 A1 | 5/2012 | Mathew et al. |
| 2012/0216714 A1 | 8/2012 | Onouchi et al. |
| 2014/0036175 A1 | 2/2014 | Morishima et al. |
| 2015/0153495 A1 | 6/2015 | Matsuda et al. |
| 2017/0129197 A1* | 5/2017 | Yaegashi .................. B32B 7/02 |

FOREIGN PATENT DOCUMENTS

| | | |
|---|---|---|
| JP | 58-62381 U | 4/1983 |
| JP | 58-65076 U | 5/1983 |
| JP | 58-168020 A | 10/1983 |
| JP | 60-36563 B2 | 8/1985 |
| JP | 1985-036563 B2 | 8/1985 |
| JP | 2002-357720 A | 12/2002 |
| JP | 2012-137738 | 7/2012 |
| JP | 2013-167835 A | 8/2013 |
| JP | 2014-081482 | 5/2014 |
| JP | 2014-164085 A | 9/2014 |
| JP | 2016-027394 A | 2/2016 |
| KR | 10-2010-0087837 A | 8/2010 |
| KR | 10-2010-0125537 A | 12/2010 |
| KR | 2010-0125537 A | 12/2010 |
| KR | 2010-0125558 A | 12/2010 |
| KR | 2012-0046035 A | 5/2012 |
| KR | 2012-0046040 A | 5/2012 |
| TW | 201224716 A1 | 6/2012 |
| TW | 201339660 A | 10/2013 |

OTHER PUBLICATIONS

Handbook of Chemistry, 1993, pp. II-42.
Office Action of Korean Patent Office in Appl'n No. 10-2017-0087655, dated Jun. 18, 2018.
Office Action of Korean Patent Office in Appl'n No. 10-2017-0140069, dated Jun. 18, 2018.
Office Action of Japanese Patent Office in Appl'n No. 2016-538496 dated Sep. 2, 2019.
U.S. Appl. No. 16/207,862.

* cited by examiner

METHOD FOR PRODUCING POLARIZING PLATE AND POLARIZING PLATE

TECHNICAL FIELD

This application is a National Stage Entry of International Application No. PCT/KR2015/006423, filed Jun. 24, 2015, and claims the benefit of and priority to Korean Application No. 10-2014-0080490, filed Jun. 30, 2014 and Korean Application No. 10-2014-0129209, filed Sep. 26, 2014, all of which are incorporated herein by reference in their entirety for all purposes as if fully set forth herein.

BACKGROUND ART

A liquid crystal display is a display visualizing polarization by a switching effect of a liquid crystal, and is used in various categories ranging from small and medium displays, such as a wrist watch, an electronic calculator, and a mobile phone, to a large-scale TV.

Recently, it is general to install various functions such as cameras and video calls in small and medium display apparatuses or notebook PCs where portability or mobility is emphasized, and in order to perform the aforementioned functions, recently released liquid crystal displays have a structure where a camera lens is exposed to the outside.

However, in the liquid crystal display, a polarizer or a polarizing plate should be surely attached onto an external surface of a liquid crystal cell, but there is a problem in that in this process, the polarizer or the polarizing plate covers the camera lens exposed to the outside, such that visibility of the lens is reduced due to intrinsic transmittance of the polarizing plate, which is less than 50%.

In order to solve this problem, when the polarizing plate is attached, a physical removal method of removing a portion of the polarizing plate covering the camera lens by piercing a hole by a method such as punching and cutting, and/or a chemical removal method of performing detachment or bleaching by using chemical materials of iodine ions in the portion of the polarizing plate covering the lens are used, but there are drawbacks in that the lens becomes damaged or contaminated and it is difficult to precisely control a removal region.

Accordingly, there is a need for research relating to a method for manufacturing a polarizing plate applied to display apparatuses having a structure where a camera lens is exposed to the outside.

PRIOR ART DOCUMENT

Patent Document

Japanese Patent Application Laid-Open No. 2003-121644

DETAILED DESCRIPTION OF THE INVENTION

Technical Problem

The present specification has been made in an effort to provide a method for manufacturing a polarizing plate and a polarizing plate.

Technical Solution

An exemplary embodiment of the present specification provides a method for manufacturing a polarizing plate, the method including: providing a polyvinyl alcohol-based polarizer dyed with at least one or more of iodine and dichromatic dyes; providing a protection film and a release film on one surface of the polarizer; and forming at least one depolarization region by bringing a decoloring solution into local contact with the other surface of the polarizer, in which the release film is provided on a surface of the protection film, which is opposite to a surface facing the polarizer, the depolarization region has a single transmittance of 80% or more and a polarization degree of 10% or less at a wavelength band in a range of 400 nm to 800 nm, and a maximum sagging depth of the depolarization region is 10 µm or less.

Another exemplary embodiment of the present specification provides a polarizing plate including: a polyvinyl alcohol-based polarizer dyed with at least one or more of iodine and dichromatic dyes; and a protection film provided on at least one surface of the polyvinyl alcohol-based polarizer, in which the polyvinyl alcohol-based polarizer has at least one depolarization region, the depolarization region has single transmittance of 80% or more and a polarization degree of 10% or less at a wavelength band in a range of 400 nm to 800 nm, and a maximum sagging depth of the depolarization region is 10 µm or less.

Yet another exemplary embodiment of the present specification provides an image display including: a display panel; and the polarizing plate attached onto one surface or both surfaces of the display panel.

Advantageous Effects

In a method for manufacturing a polarizing plate according to an exemplary embodiment of the present specification, it is possible to provide the polarizing plate where surface roughness and a haze of a depolarization region are excellent by suppressing a phenomenon when a polarizer absorbs moisture to be swollen in a decoloring process and thus minimizing fine wrinkles.

Further, in the method for manufacturing the polarizing plate according to the exemplary embodiment of the present specification, it is possible to provide the polarizing plate having an improved appearance by minimizing sagging of the polarizer in a direction of a protection film in the decoloring process.

Further, in the method for manufacturing the polarizing plate according to the exemplary embodiment of the present specification, it is possible to reduce a defect ratio when the protection film is attached to the polarizer, by minimizing sagging of the polarizer in the direction of the protection film in the decoloring process to uniformly apply an adhesive on the surface of the polarizer.

In a polarizing plate according to the exemplary embodiment of the present specification, it is possible to implement a vivid image quality in the case where a camera module is equipped in a depolarization region by minimizing a maximum sagging depth of the depolarization region.

Further, in the polarizing plate according to the exemplary embodiment of the present specification, since a bending occurrence phenomenon in the depolarization region is less frequent, it is possible to minimize an appearance vitiation phenomenon of the polarizing plate.

In the polarizing plate according to the exemplary embodiment of the present specification, it is possible to demonstrate excellent performance by minimizing a distortion phenomenon of the depolarization region.

BRIEF DESCRIPTION OF DRAWINGS

The patent or application file contains at least one drawing executed in color. Copies of this patent or patent application

BEST MODE

Figure 1:
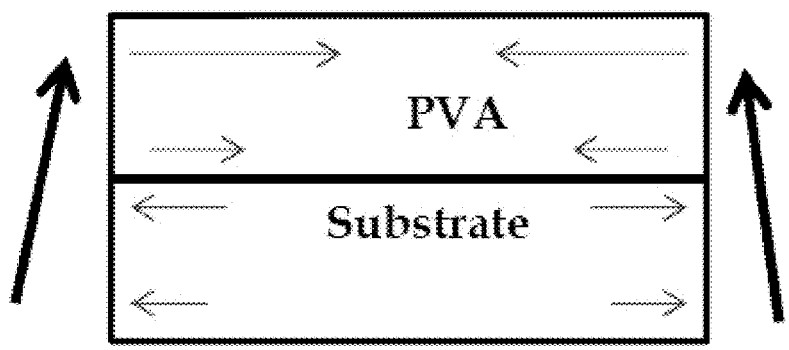
FIG. 1 is a view illustrating a cause of sagging in a process for manufacturing a polarizing plate.

In the present specification, it will be understood that when an element is referred to as being positioned "on" another element, the element can be directly on the other element or intervening elements may also be present between the two elements.

In the present specification, unless explicitly described to the contrary, the word "comprise" and variations such as "comprises" or "comprising", will be understood to imply the inclusion of stated elements but not the exclusion of any other elements.

Hereinafter, the present specification will be described in more detail.

In the case of a polarizing plate in the related art, since an entire region of the polarizing plate is dyed with iodine and/or dichromatic dyes, the polarizing plate has a dark black color, and as a result, there are problems in that it is difficult to provide various colors to a display device, and particularly, in the case where the polarizing plate is positioned on parts such as cameras, 50% or more of the quantity of light is absorbed by the polarizing plate to reduce visibility of a camera lens.

In order to solve the problems, a method of physically removing a portion of the polarizing plate, which covers the camera lens, by piercing a hole (boring) in the portion of the polarizing plate by a method such as punching and cutting has been commercialized.

However, the aforementioned physical method degrades an appearance of an image display, and the polarizing plate may be damaged due to characteristics of a process of piercing the hole. Meanwhile, in order to prevent damage such as tearing of the polarizing plate, a bored portion of the polarizing plate should be formed in a region sufficiently far away from a corner, and as a result, there is a problem in that in the case when the polarizing plate is applied, a bezel portion of the image display is relatively widened to deviate from a current narrow bezel design trend of the image display for implementing a large screen. Further, there is a problem in that as described above, in the case where a camera module is equipped in the bored portion of the polarizing plate, since the camera lens is exposed to the outside, the camera lens is easily contaminated and damaged when the camera lens is used over a long period of time.

In order to solve problems of the aforementioned physical method, a chemical method is proposed, but there are problems in that since it is difficult to perform precise detachment of iodine in a polarizer of a desired portion due to diffusion of used chemical materials, it is difficult to control a depolarization region and it is difficult to apply the chemical method in a state of the polarizing plate onto which a protection film is attached.

Accordingly, the present specification provides a chemical method where a hole is not physically pierced, an appearance is not vitiated, and polarizing can be removed by only a simple process. Specifically, there is provided a chemical method where fine wrinkles and surface roughness occurring in the depolarization region are suppressed to reduce a haze and a bending phenomenon in the depolarization region is minimized.

The present inventors found that in the case where a decoloring solution came into selective contact with some regions of a polyvinyl alcohol-based polarizer dyed with iodine and/or dichromatic dyes to locally form the depolarization region, unlike a physical removing method such as punching and cutting, boring was not formed, and fine wrinkles of the depolarization region could be minimized by laminating a protection film and a release film on one surface of the polarizer and then performing a decoloring process to suppress a swelling phenomenon of the polarizer.

Generally, in the case where the decoloring solution comes into direct contact with the polyvinyl alcohol-based polarizer on which the protection film is not laminated, the swelling phenomenon of the polarizer occurs due to moisture, and thus wrinkles may be formed in the depolarization region and a surrounding region thereof. In this case, surface roughness of the depolarization region is increased to increase a haze, and as a result, it is difficult to sufficiently secure an appearance of the polarizing plate and visibility of a camera positioned in the depolarization region. Moreover, in the case where the protection film is laminated on one surface of the polarizer without the release film and the polarizer is then locally decolored, since the protection film and the polarizer are adhered to each other, the swelling phenomenon and generation of the wrinkles may be suppressed to some degree, but it is difficult to suppress a sagging phenomenon according to shrinkage force of the polarizer by only the protection film. Accordingly, the present inventors found that in the case where the release film was provided on the protection film, the sagging phenomenon according to shrinkage force of the polarizer when the polarizer was decolored could be largely improved. Specifically, the present inventors found that the sagging phenomenon by MD shrinkage caused by swelling of the polarizer could be minimized by laminating the release film on one surface of the protection film and then performing the decoloring process.

As described above, generation of the wrinkles may be suppressed by laminating the protection film before contact of the decoloring solution, but due to swelling of the elongated polarizer, when the decoloring process is performed, sagging that the protection film and the polarizer are sagged toward the protection film by shrinkage force of the polarizer occurs. Considering a description with reference to FIG. 1, when the decoloring solution comes into contact with the polarizer, the elongated polarizer shrinks, and accordingly, force that the protection film endures the shrinkage is generated, and as a result, sagging that the polarizer and the protection film are sagged convexly toward the protection film occurs. Accordingly, like the method for manufacturing the polarizing plate according to the exemplary embodiment of the present specification, before contact of the decolorant, the release film may be laminated on a surface of the protection film, which is opposite to a surface facing the polarizer, to increase force enduring shrinkage of the polarizer and thus suppress the occurrence of sagging.

The present specification provides a polarizer where an appearance of a depolarization region is improved, and a method for manufacturing the same.

The exemplary embodiment of the present specification provides a method for manufacturing a polarizing plate, the method including: providing a polyvinyl alcohol-based polarizer dyed with at least one or more of iodine and dichromatic dyes; providing a protection film and a release film on one surface of the polarizer; and forming at least one depolarization region by bringing a decoloring solution into local contact with the other surface of the polarizer, in which the release film is provided on a surface of the protection film, which is opposite to a surface facing the polarizer, the depolarization region has single transmittance of 80% or more and a polarization degree of 10% or less at a wavelength band in a range of 400 nm to 800 nm, and a maximum sagging depth of the depolarization region is 10 µm or less.

In the present specification, "provision" may mean "lamination".

In the present specification, "single transmittance" is represented by an average value of transmittance of an absorption axis and transmittance of a transmission axis of the polarizing plate. Further, "single transmittance" and "polarization degree" of the present specification are values measured by using the V-7100 model manufactured by JASCO company.

According to the manufacturing method according to the exemplary embodiment of the present specification, even though the decoloring process for forming the depolarization region having a predetermined area or more is performed, the maximum sagging depth in the depolarization region may be adjusted to 10 µm or less.

According to the exemplary embodiment of the present specification, the maximum sagging depth of the depolarization region may be 8 µm or less, 7 µm or less, or 6 µm or less.

Hereinafter, each step of the manufacturing method according to the exemplary embodiment of the present specification will be more specifically described.

The polyvinyl alcohol-based polarizer may be manufactured through a method for manufacturing a PVA polarizer well known in the corresponding technical field, or may be used by purchasing a polyvinyl alcohol-based polarizer that is available on the market.

A step of providing the polyvinyl alcohol-based polarizer may be, for example, performed through a dyeing step of dyeing a polyvinyl alcohol-based polymer film with the iodine and/or dichromatic dyes, a cross-linking step of cross-linking the polyvinyl alcohol-based film and the dye, and an elongation step of elongating the polyvinyl alcohol-based film, but the step is not limited thereto.

First, the dyeing step is configured to dye the iodine molecules and/or dichromatic dyes on the polyvinyl alcohol-based film, and the iodine molecules and/or dichromatic dye molecules may absorb light that vibrates in an elongation direction of the polarizer and allow light that vibrates in a vertical direction to pass, thus obtaining polarization having a predetermined vibration direction. In this case, the dyeing may be, for example, performed by impregnating the polyvinyl alcohol-based film in a treatment bath including an iodine solution and/or a solution containing the dichromatic dye.

In this case, as a solvent used in the solution of the dyeing step, water is generally used, but an organic solvent having compatibility with water may be added in an appropriate amount. Meanwhile, the iodine and/or dichromatic dyes may be used in a content of 0.06 parts by weight to 0.25 parts by weight based on 100 parts by weight of the solvent. In the case where the content of the dichromatic material such as iodine is in the aforementioned range, transmittance of the polarizer manufactured after elongation may satisfy the range of 40.0% to 47.0%.

Meanwhile, in the case where iodine is used as the dichromatic material, in order to improve dyeing efficiency, it is preferable that a supplement agent such as an iodide compound be further contained, and the supplement agent may be used at a ratio of 0.3 parts by weight to 2.5 parts by weight based on 100 parts by weight of the solvent. In this case, the supplement agent such as the iodide compound is added in order to increase solubility of iodine to water because solubility of iodine to water is low. Meanwhile, it is preferable that a mixing ratio of iodine and the iodide compound be about 1:5 to 1:10 on the basis of a weight.

Specific examples of the iodide compound that may be added may include potassium iodide, lithium iodide, zinc iodide, aluminum iodide, lead iodide, copper iodide, barium iodide, calcium iodide, tin iodide, titanium iodide, a mixture thereof, or the like, but are not limited thereto.

Meanwhile, it is preferable that a temperature of the treatment bath be maintained at about 25° C. to 40° C. In the case where the temperature of the treatment bath is less than 25° C., dyeing efficiency may be reduced, and in the case where the temperature thereof is more than 40° C., much sublimation of iodine may occur to increase a use amount of iodine.

In this case, it is preferable that an immersion time of the polyvinyl alcohol-based film in the treatment bath be about 30 seconds to 120 seconds. This is because in the case where the immersion time is less than 30 seconds, dyeing may not be uniformly performed on the polyvinyl alcohol-based film, and in the case where the immersion time is more than 120 seconds, dyeing is saturated, and thus immersion is not needed any longer.

Meanwhile, the cross-linking step is configured to adsorb the iodine and/or dichromatic dyes on a polyvinyl alcohol polymer matrix, and a deposition method for performing the cross-linking step by depositing the polyvinyl alcohol-based film in a cross-linking bath including a boric acid aqueous solution and the like is generally used, but the method is not limited thereto, and the cross-linking step may be performed by an application method or spray method for applying or spraying a solution including a cross-linking agent on the polyvinyl alcohol-based film.

In this case, as a solvent used in the solution of the cross-linking bath, water is generally used, but an organic solvent having compatibility with water may be added in an appropriate amount, and the cross-linking agent may be added in an amount of 0.5 parts by weight to 5.0 parts by weight based on 100 parts by weight of the solvent. In this case, in the case where the cross-linking agent is contained in the amount of less than 0.5 parts by weight, cross-linking is insufficient in the polyvinyl alcohol-based film, and thus strength of the polyvinyl alcohol-based film in water may be reduced, and in the case where the amount is more than 5.0 parts by weight, excessive cross-linking is formed, and thus an elongation property of the polyvinyl alcohol-based film may deteriorate. Specific examples of the cross-linking agent may include a boron compound such as a boric acid and borax, glyoxal, glutaraldehyde, and the like, and may be used alone or may be used in combination. However, the examples are not limited thereto.

Meanwhile, a temperature of the cross-linking bath depends on the amount and an elongation ratio of the cross-linking agent and is not limited thereto, but, generally, it is preferable that the temperature be 45° C. to 60° C. Generally, if the amount of the cross-linking agent is increased, in order to improve mobility of chains of the polyvinyl alcohol-based film, the temperature of the cross-linking bath is adjusted to a high temperature condition, and if the amount of the cross-linking agent is small, the temperature of the cross-linking bath is adjusted to a relatively low temperature condition. However, since the method for manufacturing the polarizing plate according to the exemplary embodiment of the present specification is a process of performing five times or more elongation, in order to improve the elongation property of the polyvinyl alcohol-based film, the temperature of the cross-linking bath should be maintained at 45° C. or more. Meanwhile, it is preferable that the immersion time of the polyvinyl alcohol-based film in the cross-linking bath be about 30 seconds to 120 seconds. This is because in the case where the immersion time is less than 30 seconds, cross-linking may not be uniformly performed on the polyvinyl alcohol-based film, and in the case where the immersion time is more than 120 seconds, cross-linking is saturated, and thus immersion is not needed any longer.

Meanwhile, elongation in the elongation step is configured to align polymer chains of the polyvinyl alcohol-based film in a predetermined direction, and an elongation method may be classified into a wet elongation method and a dry elongation method, the dry elongation method is classified into an inter-roll elongation method, a heating roll elongation method, a compression elongation method, a tenter elongation method, and the like, and the wet elongation method is classified into a tenter elongation method, an inter-roll elongation method, and the like.

In this case, it is preferable that in the elongation step, the polyvinyl alcohol-based film be elongated at an elongation ratio of 4 times to 10 times. The reason is that the polymer chains of the polyvinyl alcohol-based film should be aligned in order to provide polarization performance to the polyvinyl alcohol-based film, and the chains may not be sufficiently aligned at the elongation ratio of less than 4 times, and the chains of the polyvinyl alcohol-based film may be cut at the elongation ratio of more than 10 times.

In this case, it is preferable that the elongation be performed at an elongation temperature of 45° C. to 60° C. This is because the elongation temperature may depend on the content of the cross-linking agent, mobility of the chains of the polyvinyl alcohol-based film may be reduced at the temperature of less than 45° C. to reduce elongation efficiency, and in the case where the temperature is more than 60° C., the polyvinyl alcohol-based film may be softened to weaken strength. Meanwhile, the elongation step may be performed simultaneously with the dyeing step or the cross-linking step or separately from the dyeing step or the cross-linking step.

Meanwhile, the elongation may be performed with only the polyvinyl alcohol-based film, or may be performed by a method of laminating a base film on the polyvinyl alcohol-based film and then elongating the polyvinyl alcohol-based film and the base film together. In the latter, in the case where the polyvinyl alcohol-based film having a small thickness (for example, PVA film of 60 μm or less) is elongated, in the elongation process, elongation may be used in order to prevent the polyvinyl alcohol-based film from being broken, and may be used in order to manufacture a thin PVA polarizer of 10 μm or less.

In this case, as the base film, polymer films having a maximum elongation magnification of 5 times or more under a temperature condition of 20° C. to 85° C. may be used, and for example, a high density polyethylene film, a polyurethane film, a polypropylene film, a polyolefin film, an ester-based film, a low density polyethylene film, high density polyethylene and low density polyethylene co-extrusion films, a copolymer resin film in which ethylene vinyl acetate is contained in high density polyethylene, an acryl film, a polyethylene terephthalate film, a polyvinyl alcohol-based film, a cellulose-based film, and the like may be used. Meanwhile, the maximum elongation magnification means an elongation magnification immediately before breakage occurs.

Further, a lamination method of the base film and the polyvinyl alcohol-based film is not particularly limited. For example, the base film and the polyvinyl alcohol-based film may be laminated via an adhesive or a cohesive agent, or may be laminated by a mode where the polyvinyl alcohol-based film is set on the base film without a separate medium. Further, lamination may be performed by a method of co-extruding a resin forming the base film and a resin forming the polyvinyl alcohol-based film, or may be performed by a method of applying a polyvinyl alcohol-based resin on the base film.

Meanwhile, the base film may be eliminated from the polarizer and removed after elongation is completed, but may not be removed but be subjected to a next step. In this case, the base film may be used as a polarizer protection film which will be described below and the like.

Next, if the polyvinyl alcohol-based polarizer is prepared through the aforementioned method, the step of providing the protection film and the release film on one surface of the polyvinyl alcohol-based polarizer is performed.

The step of providing the protection film and the release film may be performed by a method of providing the release film on one surface of the protection film and then providing the polarizer on a surface of the protection film, on which the release film is not provided, or a method of providing the protection film on one surface of the polarizer and then providing the release film on a surface of the protection film, which is opposite to a surface facing the polarizer.

The release film may be provided on the surface of the protection film, which is opposite to the surface facing the polarizer. Specifically, a lamination structure of the polarizer/protection film/release film may be formed by the step of providing the protection film and the release film.

Since the protection film and the release film serve to prevent deformation of an external shape such as shrinkage of the polarizer in the step of forming the depolarization region, the step of providing the protection film and the release film may be performed before the step of forming the depolarization region.

In this case, the protection film is a film for protecting the polarizer having a very small thickness, and refers to a transparent film attached onto one surface of the polarizer, and a film having excellent mechanical strength, thermal stability, moisture blocking property, and isotropicity may be used. For example, an acetate-based resin film such as triacetyl cellulose (TAC), and polyester-based, polyether-sulfone-based, polycarbonate-based, polyamide-based, polyimide-based, polyolefin-based, cycloolefin-based, polyurethane-based, and acryl-based resin films, and the like may be used, but the protection film is not limited thereto.

Further, the protection film may be an isotropic film or an anisotropic film to which a compensation function such as retardation is provided, and the protection film may be constituted as one film or may be constituted by attaching two films or more. Further, the protection film may be a non-elongated film or a uniaxially or biaxially elongated film, and a thickness of the protection film may be generally 1 μm to 500 μm and preferably 1 μm to 300 μm.

In this case, adhesion force of the protection film to the polyvinyl alcohol-based polarizer may be preferably 1 N/2 cm or more and more preferably 2N/2 cm or more. Specifically, the aforementioned adhesion force means adhesion force measured by 90° stripping force by using a texture analyzer after the protection film is attached onto the polyvinyl alcohol-based polarizer dyed with at least one or more of the iodine and dichromatic dyes. In the case where the adhesion force satisfies the aforementioned range, swelling of the protection film and the polyvinyl alcohol-based polarizer may be suppressed, and in a manufacturing process, the occurrence of curls and defects may be minimized.

Meanwhile, in the step of laminating the protection film on one surface of the polyvinyl alcohol-based polarizer, the protection film is attached onto the polarizer, and attachment may be performed by using an adhesive. In this case, attachment may be performed through a lamination method of films known in the corresponding technical field, and for example, attachment may be performed by using an adhesive known in the corresponding technical field, such as a water-based adhesive such as a polyvinyl alcohol-based adhesive, a thermosetting adhesive such as a urethane-based adhesive, a light cation curable adhesive such as an epoxy-based adhesive, and a light radical curable adhesive such as an acryl-based adhesive.

In the step of providing the release film on the surface of the protection film, which is opposite to the surface facing the polarizer, the release film is adhered onto the protection film, and attachment may be performed by using a cohesive agent. The cohesive agent may be a pressure sensitive adhesive (PSA). Further, according to the exemplary embodiment of the present specification, the aforementioned release film may be a release film having cohesive force. That is, the protection film and the release film are provided like one film on one surface of the polarizer. That is, as described above, the release film is applied in order to increase force enduring shrinkage of the polarizer, and as a result, the release film may suppress the occurrence of sagging.

According to the exemplary embodiment of the present specification, the release film may have tensile strength of 6000 N or more. Further, according to the exemplary embodiment of the present specification, the release film may have tensile strength of 6500 N or more. Further, according to the exemplary embodiment of the present specification, the release film may have tensile strength of 7000 N or more or 7200 N or more.

In the case where the release film has tensile strength of 6000 N or more, in the step of forming the depolarization region, sagging of the polarizer in a direction of the protection film may be effectively suppressed. Specifically, in the case where the release film has tensile strength of 6000 N or more, when the polarizer shrinks, shrinkage of the protection film together with the polarizer may be effectively prevented.

In the case where the release film has tensile strength of 6000 N or more, the maximum sagging depth in the depolarization region may be adjusted to 10 μm or less.

The tensile strength means a value obtained through the following Equation 1.

Tensile strength (N)=modulus (N/mm$^2$)×thickness of release film (mm)×width of release film (mm) [Equation 1]

In the present specification, the modulus (Young's modulus) refers to a value obtained by fixing both ends of a sample prepared according to the JIS-K6251-1 standard and then applying force in a direction, which is vertical to a thickness direction of the release film, to measure stress per unit area according to strain, and in this case, as an measurement apparatus, for example, a tensile strength tester (Zwick/Roell Z010 UTM) and the like may be used.

Tensile strength of the release film may be adjusted by changing the thickness of the release film. The degree of change in tensile strength according to the thickness of the release film may be changed according to a material of the release film. However, a method for adjusting tensile strength of the release film is not limited thereto.

Cohesive force of the release film to the protection film may be preferably 0.1 N/2 cm to 10 N/2 cm, and more preferably 0.5 N/2 cm to 5 N/2 cm. There are merits in that if the cohesive force of the release film is 0.1 N/2 cm or more, deformation force of the protection film may be effectively transferred to the release film to secure a suppression effect of the occurrence of sagging, and in the case where the cohesive force thereof is 10 N/2 cm or less, the release film may be effectively stripped from a final product.

The protection film and the release film may be homogeneous or heterogeneous.

The aforementioned description relating to the protection film may be applied to the release film, except for a description relating to the cohesive agent and the cohesive force.

Next, as described above, the step of forming at least one depolarization region is performed by bringing the decoloring solution into local contact with the other surface of the polarizer including the protection film and the release film.

Through the step of forming the depolarization region, the depolarization region has single transmittance of 80% or more and the polarization degree of 10% or less at a wavelength band in a range of 400 nm to 800 nm.

The depolarization region may be continuously formed in one region of the polarizer not requiring a polarizing effect. Specifically, the depolarization region may be a region of the polarizer where a camera module is positioned.

According to the exemplary embodiment of the present specification, an area of at least one depolarization region may be 0.5 mm$^2$ or more and 500 mm$^2$ or less.

In the case where the decoloring solution comes into contact with the polarizer to form the depolarization region, the maximum sagging depth according to distortion of an appearance of the polarizer may be increased as the area of the depolarization region is increased. However, in the manufacturing method according to the exemplary embodiment of the present specification, the release film may be provided to suppress the maximum sagging depth to 10 μm or less even though the area of the depolarization region is 0.5 mm$^2$ or more and 500 mm$^2$ or less.

In this case, the other surface of the polarizer refers to an opposite surface where the protection film and the release film are not provided. That is, since the decoloring solution should come into direct contact with the polyvinyl alcohol-based polarizer, not the protection film and the release film but, the present step should be performed over the other surface of the polarizer.

According to the exemplary embodiment of the present specification, the depolarization region may be formed at a ratio of 0.005% to 40% based on the entire polarizing plate.

Meanwhile, the decoloring solution essentially includes a decolorant which may decolor the iodine and/or dichromatic dyes, and a solvent. The decolorant is not particularly limited as long as the decolorant may decolor the iodine and/or dichromatic dyes dyed on the polarizer. According to the exemplary embodiment of the present specification, the decoloring solution may include one kind or more decolorants selected from the group consisting of sodium hydroxide (NaOH), sodium hydrosulfide (NaSH), sodium azide (NaN$_3$), potassium hydroxide (KOH), potassium hydrosulfide (KSH), and potassium thiosulfate (KS$_2$O$_3$).

The decoloring solution may include the decolorant in a content of 1 wt % to 30 wt %.

As the solvent, it is preferable that water such as distilled water be used. Further, the solvent may be used while being additionally mixed with an alcohol-based solvent. For example, the solvent may be used while being mixed with methanol, ethanol, butanol, isopropyl alcohol, or the like, but the solvent is not limited thereto.

Meanwhile, the content of the decolorant in the decoloring solution may be changed according to a contact time in a decoloring process, but the decolorant may be included in the content of preferably about 1 wt % to 30 wt % and more preferably about 5 wt % to 15 wt %, based on the total weight of the decoloring solution. In the case where the content of the decolorant is less than 1 wt %, decoloring is not performed or decoloring is performed for a time of decades minutes or more, and thus it is difficult to substantially apply the decolorant, and in the case where the content thereof is more than 30 wt %, since the decoloring solution is not easily diffused into the polarizer, an increment in decoloring efficiency is insignificant, and thus economic feasibility is reduced.

Further, according to the exemplary embodiment of the present specification, a pH of the decoloring solution may be 11 to 14. Preferably, the pH may be pH 13 to 14. The decolorant is a strong basic compound and should have a strong basic property enough to break boric acid forming a cross-linking bond with polyvinyl alcohol, and in the case where the pH satisfies the aforementioned range, decoloring may occur well. For example, as a solution decomposing (decoloring) iodine to secure transparency (iodine clock reaction), sodium thiosulfate (pH 7) may cause decoloring in a general iodine compound aqueous solution but does not cause decoloring in an actual polarizer (PVA) even though contact is performed over a long period of time (10 hours). That is, this refers to that the cross-linking bond of the boric acid needs to be broken due to the strong base before iodine is decomposed.

Meanwhile, it is preferable that the step of forming the depolarization region be performed in the decoloring solution at 10° C. to 70° C. for 1 second to 60 seconds. There may be problems in that in the case where the temperature and the immersion time of the decoloring solution deviate from the aforementioned numerical range, swelling and syneresis of the polarizer occur by the decoloring solution, and thus bending of the polarizer occurs or decoloring occurs even in an undesired region.

Meanwhile, in the present specification, the step of forming the depolarization region by bringing the decoloring solution into contact with the polarizer may be performed by using a printing device and the like. According to the exemplary embodiment of the present specification, the step of forming the depolarization region may be performed by a dispenser, inkjet, or gravure printing method. The dispenser or inkjet method is a non-contact type printing method where the decolorant is applied on a desired local portion or in a pattern having a desired shape, and the gravure printing method is a contact type printing method.

To be more specific, in consideration of easiness of performing a continuous process, it is preferable that the aforementioned device be a device performing printing by an inkjet marking method, the gravure printing method, or the like. In this case, the inkjet marking method refers to a printing method performed in a mode where ink liquid drops are dripped on a target (PVA polarizer) to be printed through an inkjet nozzle, and the gravure printing method refers to a printing method performed in a mode where ink is filled in a printing roll on which a shape to be printed is engraved, ink of a region other than the engraved portion is removed through a doctor blade and the like to allow ink to remain in only the engraved portion, and the ink filled in the engraved portion is then transferred onto a target (PVA polarizer) to be printed by using a transferring roll.

Further, in the present specification, the step of forming the depolarization region by bringing the decoloring solution into contact with the polarizer may be performed by using an immersion method. Specifically, in the immersion method, after a mask layer is formed on one surface of the polarizer, the polarizer including the protection film and the release film may be immersed in the decoloring solution.

According to the exemplary embodiment of the present specification, the method may further include, before the step of forming the depolarization region, forming a mask layer including at least one or more bored portions on the other surface of the polarizer. In this case, the mask layer may be formed of a mask film or a coating layer.

According to the exemplary embodiment of the present specification, the step of forming the mask layer may be performed before the step of providing the protection film and the release film.

There are merits in that in the case where before the step of forming the depolarization region, the step of forming the mask layer is performed, since a portion not requiring depolarization, that is, a portion not requiring decoloring is not covered by the mask layer, a defect occurrence ratio in a roll-to-roll process may be reduced, and since the polyvinyl alcohol-based polarizer and the mask layer are laminated, a process speed is not limited.

If the polarizer where the mask layer including the bored portion is formed is immersed in the decoloring solution, the decoloring solution comes into contact with the polyvinyl alcohol-based polarizer through the bored portion, and as a result, decoloring partially occurs in only a portion corresponding to a bored portion region.

According to another exemplary embodiment, in the case where the mask film is used as the mask layer, the step of forming the mask layer may include: forming the bored portion in the mask film; and attaching the mask film onto the other surface of the polarizer.

Specifically, in the step of forming the mask layer, the bored portion may be formed in at least one region of the mask film, and the mask film may be attached onto the other surface of the polarizer. Further, in the step of forming the mask layer, a coating layer may be formed on the other surface of the polarizer, and at least one region of the coating layer may be selectively removed to form the bored portion.

In this case, as the mask film, an olefin-based film such as polyethylene (PE), polypropylene (PP), and polyethylene terephthalate (PET); or a vinyl acetate-based film such as ethylene vinyl acetate (EVA) and polyvinyl acetate may be used, but the mask film is not limited thereto. Further, the thickness of the mask film may be about 10 µm to 100 µm and preferably about 10 µm to 70 µm, but is not limited thereto.

The step of forming the bored portion in the mask film is not particularly limited, and may be performed through film boring methods well known in the corresponding technical field, for example, die processing, knife processing, laser processing, and the like.

According to the exemplary embodiment of the present specification, the step of forming the bored portion may be performed through laser processing. The laser processing may be performed by using laser processing devices generally known in the corresponding technical field, but is not particularly limited. Laser processing conditions such as a kind, power, and a laser pulse repetition rate of the laser device may be changed according to a material or a thickness of the film, a shape of the bored portion, and the like, and in consideration of the aforementioned matters, a person with ordinary skill in the art may appropriately select the laser process conditions. For example, in the case where the polyolefin film having a thickness of 30 µm to 100 µm is used as the mask film, the bore portion may be formed by using a carbon dioxide ($CO_2$) laser device having a central wavelength of about 9 µm to 11 µm, a UV device having a central wavelength of about 300 nm to 400 nm, or the like, and in this case, maximum average power of the laser device may be about 0.1 W to 30 W and the pulse repetition rate thereof may be about 0 kHz to 50 kHz, but the laser device is not limited thereto.

The step of forming the bored portion may be performed before or after the step of attaching the mask film onto the other surface of the polarizer. In other words, the bored portion may be previously formed in the mask film and the mask film where the bored portion is formed may be then attached onto the polarizer, or the mask film may be attached onto the polarizer and the bored portion may be then formed.

The step of attaching the mask film onto the other surface of the polarizer may be performed by film lamination methods well known in the corresponding technical field, for example, a method for attaching the mask film and a polarizing member through a cohesive layer, and in this case, the cohesive layer may be formed by applying a cohesive agent, such as an acryl-based cohesive agent, a silicon-based cohesive agent, an epoxy-based cohesive agent, and a rubber-based cohesive agent, on the mask film or the polarizing member, but the method and the cohesive agent are not limited thereto. For example, in the case where films having self-cohesive force (for example, EVA film, PVAC film, PP film, and the like) are used as the mask film, the mask film may be directly attached onto the other surface of the polarizer while the cohesive layer is not formed.

According to the exemplary embodiment of the present specification, in the case where the mask layer is formed by the coating layer, the step of forming the mask layer includes: forming the coating layer on the other surface of the polarizer; and forming the bored portion by selectively removing some regions of the coating layer.

The step of forming the coating layer may be performed by a method for applying a composition for forming the coating layer on the other surface of the polarizer, and then performing drying or irradiating heat or an active energy beam such as a UV beam or an electron beam to cure the coating layer.

A kind of the composition for forming the coating layer is not particularly limited as long as the composition may be etched by a laser and is not dissolved in an alkaline solution. For example, as the composition for forming the coating layer, a composition including a dispersible polymer resin such as water-dispersible polyurethane, water-dispersible polyester, and a water-dispersible acryl copolymer, or a photosensitive resin composition may be used. Meanwhile, as the photosensitive resin composition, photosensitive resin compositions that are available on the market, for example, a positive type photoresist, a negative type photoresist, or the like may be used, but the photosensitive resin composition is not particularly limited.

According to the exemplary embodiment of the present specification, the coating layer may be formed by using the polymer resin composition or the photosensitive resin composition.

A method for applying the composition for forming the coating layer is not particularly limited, and application may be performed through an application method generally used in the corresponding technical field, for example, bar coating, spin coating, roll coating, knife coating, spray coating, or the like, and the curing may be performed by a method for applying heat or irradiating the active energy beam, such as the ultraviolet beam or the electron beam, on the applied resin composition.

According to the exemplary embodiment of the present specification, a thickness of the coating layer may be 100 nm to 500 nm. There are merits in that in the case where the thickness of the coating layer satisfies the aforementioned numerical range, when the bored portion is processed, the polyvinyl alcohol-based polarizer may be prevented from being damaged, and a process of removing the coating layer after the decoloring process need not be additionally performed.

The step of forming the bored portion by selectively removing some regions of the coating layer may be performed by a method for irradiating the energy beam on some regions of the coating layer, followed by vaporization, a photolithography method, or the like.

The method for vaporizing some of the coating layer may be performed by using devices generally known in the corresponding technical field, for example, a UV laser device having a central wavelength of about 300 nm to 400 nm, an IR laser device having a central wavelength of about 1000 nm to 1100 nm, a green laser device having a central wavelength of about 500 nm to 550 nm, or the like. Meanwhile, laser processing conditions such as a kind, laser power, and a pulse repetition ratio of the used laser device may be changed according to a kind and a thickness of the coating layer, formation of the bored portion to be formed, and the like, and in consideration of the aforementioned matters, a person with ordinary skill in the art may appropriately select the laser process conditions.

According to the exemplary embodiment of the present specification, the step of forming the bored portion by selectively removing some regions of the coating layer may be performed through laser processing.

Meanwhile, in the case where the coating layer is formed of the photosensitive resin composition, the bored portion may be formed through a photolithography process, and for example, the bored portion may be formed by a method for applying the photosensitive resin composition on the other surface of the polarizing plate, and selectively exposing the energy beam of a region corresponding to the bored portion, followed by developing by using a developing solution.

In this case, the exposure may be performed by using a light source such as an ultraviolet beam or an energy beam such as a laser. There are merits in that in the case where exposure is performed by using the laser, a separate mask may not be used for exposure, and a shape of the bored portion may be relatively freely formed.

To be more specific, in the exemplary embodiment of the present specification, in the case where the coating layer is formed in a thickness of 200 nm by using a photosensitive resin material, exposure may be performed by using a core having maximum average power of about 0.1 W to 10 W and a UV laser of 300 nm to 400 nm, and in this case, an action pulse repetition rate of the laser may be about 30 kHz to 100 kHz.

Meanwhile, in the developing, an appropriate developing solution may be selected to be used according to a kind of the used photosensitive resin, and in some cases, the aforementioned decoloring solution may be used as the developing solution. In this case, a separate developing step may not be performed.

Meanwhile, the bored portion may be formed to correspond to a shape of a region to be decolored, and a shape or a formation position thereof is not particularly limited. For example, the bored portion may be formed at a position at which parts such as a camera are equipped, so as to correspond to a shape of the parts, or may be formed in a region in which a product logo is printed in a shape of the product logo, or in the case where a color is provided to an edge portion of the polarizer, the bored portion may be formed at the edge portion of the polarizer to have a frame shape.

According to the exemplary embodiment of the present specification, after the step of forming the depolarization region, if necessary, a step of removing a mask layer may be further included. The step of removing the mask layer may be performed by a method for stripping the mask layer from the polarizer. In the case where the mask film is used as the mask layer, it is preferable to perform the present step, but in the case where the coating layer is used as the mask layer, the present step may not be performed. To be more specific, the step of removing the mask layer may be performed by a method for stripping the mask layer from the polarizer by using a stripping roll and the like.

According to the exemplary embodiment of the present specification, a viscosity of the decoloring solution may be 1 cP to 2000 cP. To be more specific, according to the exemplary embodiment of the present specification, the viscosity of the decoloring solution may be 5 cP to 2000 cP. This is because in the case where the viscosity of the decoloring solution satisfies the aforementioned numerical range, a printing process may be smoothly performed, and diffusion or flowing down into the printed decoloring solution according to movement of the polarizing member in a continuous process line may be prevented, and thus the decoloring region may be formed in a desired shape in a desired region. Meanwhile, the viscosity of the decoloring solution may be appropriately changed according to surface properties of the used printing device and polarizer and the like. For example, in the case where the gravure printing method is used, the viscosity of the decoloring solution may be about 1 cP to 2000 cP and preferably about 5 cP to 200 cP, and in the case where the inkjet printing method is used, the viscosity of the decoloring solution may be about 1 cP to 55 cP and preferably about 5 cP to 20 cP.

According to the exemplary embodiment of the present specification, the decoloring solution may further include a viscosity agent. In order to allow the viscosity of the decoloring solution to satisfy the aforementioned range, it is preferable to use a method for further adding the viscosity agent. Therefore, the viscosity agent improves the viscosity of the decoloring solution to help to suppress diffusion of the solution and form the depolarization region having a desired size at a desired position. If the solution having the high viscosity is applied on the rapidly moving polarizer, since a relative speed difference between a liquid and the polarizer, which is generated when application is performed, is reduced, diffusion of the solution into an undesired portion is prevented, and fluidization of the solution, which is applied for a time when decoloring is performed until washing after application, is reduced, and thus a depolarization region having a desired position or size may be formed.

The viscosity agent is not particularly limited as long as the viscosity agent has low reactivity and may increase the viscosity of the solution. According to the exemplary embodiment of the present specification, the viscosity agent includes one kind or more selected from the group consisting of a polyvinyl alcohol-based resin, a polyvinyl acetoacetate-based resin, a acetoacetyl group-denatured polyvinyl alcohol-based resin, butenediolvinyl alcohol-based and polyethylene glycol-based resins, and a polyacrylamide-based resin.

According to another exemplary embodiment, the viscosity agent may be included in a content of 0.5 wt % to 30 wt % based on the total weight of the decoloring solution. Specifically, according to the exemplary embodiment of the present specification, the viscosity agent may be included in a content of 2.5 wt % to 15 wt % based on the total weight of the decoloring solution. In the case where the content of the viscosity agent is more than the aforementioned range, the viscosity is excessively increased, and thus washing is not effectively performed, and in the case where the content of the viscosity agent is excessively low, the viscosity is low, and thus it is difficult to implement a decolored region having a desired shape and a desired size by diffusion and fluidization of the liquid.

According to the exemplary embodiment of the present specification, the decoloring solution may include: 1 wt % to 30 wt % of the decolorant; 0.5 wt % to 30 wt % of the viscosity agent; and 40 wt % to 70 wt % of water, based on the total weight.

Further, the depolarization region may have various shapes but is not limited thereto, and the depolarization region may be formed at any position on the entire polarizing plate.

Meanwhile, a depolarization mechanism through the depolarization step of the present specification will be specifically described below. It is known that a polyvinyl alcohol complex dyed with the iodine and/or dichromatic dyes may absorb light in a range of visible rays, such as the wavelength band in a range of 400 nm to 800 nm. In this case, if the decoloring solution comes into contact with the polarizer, the iodine and/or dichromatic dyes absorbing light having the visible-ray wavelength band existing in the polarizer are decomposed to decolor the polarizer and thus increase transmittance and reduce the polarization degree.

For example, in the case where the aqueous solution including potassium hydroxide (KOH), which is the decolorant, comes into contact with some regions of the polyvinyl alcohol-based polarizer dyed with iodine, as indicated by the following Chemical Formulas 1 and 2, iodine is decomposed by a series of processes. Meanwhile, in the case where a boric acid cross-linking process is performed when the polyvinyl alcohol-based polarizer dyed with iodine is manufactured, as described in the following Chemical Formula 3, potassium hydroxide directly decomposes the boric acid to remove a cross-linking effect through hydrogen bonding of polyvinyl alcohol and the boric acid.

$$12KOH + 6I_2 \rightarrow 2KIO_3 + 10KI + 6H_2O \quad \text{[Chemical Formula 1]}$$

$$I_5^- + IO_3^- + 6H^+ \rightarrow 3I_2 + 3H_2O$$

$$I_3^- \rightarrow I^- + I_2 \quad \text{[Chemical Formula 2]}$$

$$B(OH)_3 + 3KOH \rightarrow K_3BO_3 + 3H_2O \quad \text{[Chemical Formula 3]}$$

That is, the polarizer absorbs light in the visible-ray region to decompose iodine and iodine ion complexes such as $I_5^-$ (620 nm), $I_3^-$ (340 nm), and $I_2^-$ (460 nm) and thus generate $I^-$ (300 nm or less) or a salt thereof, thereby allowing most of the light in the visible-ray region to penetrate. Accordingly, since the polarizer is depolarized in the region of about 400 nm to 800 nm, which is the visible-ray region, transmittance is entirely increased to make the polarizer transparent. In other words, in order to make polarization in the polarizer, arranged iodine complexes absorbing the visible rays may be decomposed into a unimolecular form not absorbing the visible rays, thereby performing depolarization.

According to the exemplary embodiment of the present specification, after the step of forming the depolarization region, a washing step using alcohol or an acid solution may be further included. In the step of forming the depolarization region, in the case where a residual decoloring solution is not appropriately washed, the solution is diffused or remains on the polarizer, and thus the depolarization region may be formed in an undesired size and an undesired shape, and it is difficult to form the depolarization region having a minute size.

Particularly, since it is easy to dry alcohol, alcohol can be easily removed, and alcohol does not affect transmittance or the polarization degree of the polarizer other than the depolarization region, and thus alcohol may be suitably used. For example, it is preferable that alcohol be ethanol, methanol, propanol, butanol, isopropyl alcohol, or a mixture thereof, but alcohol is not limited thereto. Further, in the case of the acid solution, the residual decolorant mainly having a basic property is subjected to a neutralization reaction with the acid solution to be removed, and as the acid solution, for example, an acetic acid aqueous solution, an adipic acid aqueous solution, a boric acid aqueous solution, a phosphoric acid aqueous solution, a lactic acid aqueous solution, a sulfuric acid aqueous solution, a nitric acid aqueous solution, or a mixture solution thereof may be used, but the acid solution is not limited thereto.

In the washing step, it is possible to use a method for immersing the polarizer in alcohol for 1 second to 180 seconds and more preferably 3 seconds to 30 seconds, or applying alcohol or the acid solution on a local portion decolored by contact with decoloring solution by using a dispenser, inkjet, or the like.

In the method for manufacturing the polarizing plate including the depolarization region according to the exemplary embodiment of the present specification, washing using alcohol or the acid solution is performed after the decolorant is used, and thus, as described above, the iodine compound, the salt, and the like formed by the decolorant are washed out, and the content of iodine and iodine ion complexes in the depolarization region is minimized. Accordingly, absorption of light by residual iodine and iodine ion complexes in the depolarization region is reduced to secure an effect of making the polarizer more transparent.

According to the exemplary embodiment of the present specification, after the step of forming the depolarization region, a step of forming an optical layer on at least one surface of the polarizer may be further included. In this case, the optical layer may be a polymer film layer such as a protection film or a retardation film, a functional film layer such as a luminance improvement film, or a functional layer such as a hard coating layer, an antireflection layer, and a cohesive layer.

To be more specific, according to the exemplary embodiment of the present specification, the optical layer is formed on the other surface of the polarizer. In other words, the optical layer is formed on a surface of the polarizer, on which the protection film and the release film are not provided.

Meanwhile, the optical layer may be directly attached onto or formed on the surface of the polyvinyl alcohol-based polarizer, or may be attached onto the protection film or the other coating layer attached onto one surface of the polyvinyl alcohol-based polarizer.

The optical layer may be formed by different methods according to a kind of the optical layer to be formed, and for example, the optical layer may be formed by using methods for forming the optical layer, which is well known in the corresponding technical field, and the method thereof is not particularly limited.

According to the exemplary embodiment of the present specification, after the step of forming the depolarization region, a step of removing the release film may be further included. The step of removing the release film may be performed by a method for stripping the release film from the protection film. To be more specific, the step of removing the release film may be performed by a method for stripping the release film from the protection film by using a stripping roll and the like.

Since the release film serves to suppress the occurrence of sagging (stretching in a direction of the protection film) in the step of forming the depolarization region, it is preferable to remove the release film after the depolarization region is formed.

The exemplary embodiment of the present specification provides a polarizing plate manufactured by the aforementioned method for manufacturing the polarizing plate.

The exemplary embodiment of the present specification provides a polarizing plate including: a polyvinyl alcohol-based polarizer dyed with at least one or more of iodine and dichromatic dyes; and a protection film provided on at least one surface of the polyvinyl alcohol-based polarizer, in which the polyvinyl alcohol-based polarizer has at least one depolarization region, the depolarization region has single transmittance of 80% or more and the polarization degree of 10% or less at a wavelength band in a range of 400 nm to 800 nm, and a maximum sagging depth of the depolarization region is 10 μm or less.

According to the exemplary embodiment of the present specification, an area of at least one depolarization region may be 0.5 mm² or more and 500 mm² or less.

In the present specification, the sagging means a phenomenon of sagging in a direction of the protection film occurring when the polyvinyl alcohol (PVA)-based polarizer comes into contact with the decoloring solution.

Specifically, a shallow depth of sagging means the low degree of sagging phenomenon, and there is a merit in that the shallow depth of sagging may minimize distortion of an appearance of the polarizing plate to uniformly apply the adhesive when the protection film and the like are laminated on the other surface. As a result, when the polarizing plate having a structure where the protection film is present on both surfaces of the polarizer is manufactured, the occurrence of defects may be reduced.

Further, there is a merit in that the shallow depth of sagging may provide the polarizing plate having an improved appearance.

According to the exemplary embodiment of the present specification, the maximum sagging depth of the depolarization region may be 8 μm or less, 7 μm or less, or 6 μm or less.

According to the exemplary embodiment of the present specification, the sagging depth of the depolarization region may be 0.1 μm or more and 10 μm or less and preferably 0.1 μm or more and 8 μm or less.

The depth of sagging may be measured by using a white light three dimension measuring machine (optical profiler) or a laser microscope (CLSM, confocal laser scanning microscope).

The depth of sagging may mean a value obtained by subtracting a minimum value from a maximum value of intervals between a surface of the polarizer, which faces the protection film, and a surface of the polarizer, which is opposite to the surface facing the protection film. Further, the depth of sagging may mean a height difference between a decoloring region and a region where decoloring is not performed, in the surface of the protection film when the polarizing plate is put on a plane surface.

The polarizing plate according to the exemplary embodiment of the present specification has a depolarization region having single transmittance of 80% or more, an arithmetic mean roughness Ra of 200 nm or less, and the polarization degree of 10% or less at the wavelength band in a range of 400 nm to 800 nm, which is included in a visible ray region. As described above, the depolarization region refers to a region formed through a process of bringing the decoloring solution into selective contact with some regions of the polyvinyl alcohol-based polarizer dyed with the iodine and/or dichromatic dyes.

In the depolarization region, single transmittance at the wavelength band in a range of 400 nm to 800 nm, which is the visible ray region, and more preferably 450 nm to 750 nm is 80% or more, preferably 90% or more, and more preferably 92% or more. Further, the polarization degree of the depolarization region is 10% or less and more preferably 5% or less. As single transmittance of the depolarization region is increased and the polarization degree is decreased, visibility is improved, and thus performance and image quality of the camera lens to be positioned in the aforementioned region may be further improved.

According to the exemplary embodiment of the present specification, single transmittance of the region other than the depolarization region of the polarizing plate is preferably 40% to 47% and more preferably 42% to 47%. Moreover, the polarization degree of the region other than the depolarization region of the polarizing plate is preferably 99% or more. This is because the residual region other than the depolarization region should exhibit excellent optical properties like the aforementioned range by functioning as an original polarizing plate.

According to the exemplary embodiment of the present specification, the arithmetic mean roughness Ra of the depolarization region may be 200 nm or less, specifically 100 nm or less or 80 nm or less, and more specifically 50 nm or less.

According to the exemplary embodiment of the present specification, a root mean square roughness Rq of the depolarization region may be 200 nm or less, specifically 100 nm or less or 80 nm or less, and more specifically 50 nm or less.

The arithmetic mean roughness Ra is a value regulated in JIS B0601-1994 and represents a value obtained by sampling a reference length from a roughness curve in a direction of a mean line thereof and summating absolute values of deviations of the sampled portion from the mean line to the measured curve, followed by averaging, and the root mean square roughness Rq is regulated in JIS B0601-2001. The arithmetic mean roughness Ra and the root mean square roughness Rq are measured by the optical profiler (Nanoview E1000, Nano System Inc.).

Generally, if roughness of the polarizer surface is increased, a haze is increased by refraction and reflection of light. In the case where roughness of the depolarization region satisfies the aforementioned range, the haze is sufficiently low, and vivid visibility may be secured.

According to another exemplary embodiment, a release film may be further provided on the surface of the protection film, which is opposite to the surface facing the polarizer.

According to the exemplary embodiment of the present specification, the haze of the depolarization region is 3% or less, preferably 2% or less, and more preferably 1% or less.

According to the exemplary embodiment of the present specification, in the depolarization region, the content of the iodine and/or dichromatic dyes is 0.1 wt % to 0.5 wt % and preferably 0.1 wt % to 0.35 wt %. This is because, as described above, iodine existing in a complex form on the polarizer is washed out by a reaction between the decolorant and iodine, and thus the content of the iodine and/or dichromatic dyes is largely reduced. Accordingly, transmittance is large improved. In comparison with this, according to the exemplary embodiment of the present specification, in a region other than the depolarization region, the content of the iodine and/or dichromatic dyes is 1 wt % to 4 wt % and preferably 2 wt % to 4 wt %.

In this case, the content of the iodine and/or dichromatic dyes was measured by using an optical X-ray analytical device (manufactured by Rigaku Electric Co., Ltd., trade name "ZSX Primus II"). In the present specification, average wt % per the volume of 19.2 $mm^3$ was measured by using a polarizer sheet-type sample having a size of 40 mm×40 mm and a thickness of 12 μm.

According to another exemplary embodiment, the depolarization region may be 0.005% to 40% of the entire polarizing plate.

Further, the exemplary embodiment of the present specification provides an image display including: a display panel; and the polarizing plate according to the aforementioned exemplary embodiment attached onto one surface or both surfaces of the display panel.

The display panel may be a liquid crystal panel, a plasma panel, and an organic light emitting panel, and thus the image display may be a liquid crystal display (LCD), a plasma display panel (PDP), and an organic light emitting diode (OLED).

To be more specific, the image display may be a liquid crystal display including a liquid crystal panel and polarizing plates provided on both surface of the liquid crystal panel, and in this case, at least one of the polarizing plates may be the polarizing plate including the polarizer according to the aforementioned exemplary embodiment of the present specification. That is, the polarizing plate is a polarizing plate including a polyvinyl alcohol-based polarizer dyed with iodine and/or dichromatic dyes, and a protection film provided on at least one surface of the polyvinyl alcohol-based polarizer, in which the polarizing plate locally has a depolarization region having single transmittance of 80% or more at a wavelength band in a range of 400 nm to 800 nm, arithmetic mean roughness Ra of the depolarization region is 200 nm or less, the polarization degree is 10% or less, and sagging is 10 μm or less.

In this case, a kind of liquid crystal panel included in the liquid crystal display is not particularly limited. For example, all publicly known panels such as a passive matrix-type panel, such as a twisted nematic (TN) type, a super twisted nematic (STN) type, a ferroelectic (F) type, or a polymer dispersed (PD) type; an active matrix-type panel such as a two terminal type or a three terminal type; and an in plane switching (IPS) panel, and a vertical alignment (VA) panel, may be applied, but the kind of liquid crystal panel is not limited thereto. Further, a kind of other constitutions constituting the liquid crystal display, for example, upper and lower substrates (for example, a color filter substrate or an array substrate) and the like, is not particularly limited, and a constitution publicly known in this field may be adopted without a limit.

According to the exemplary embodiment of the present specification, the image display may be an image display further including a camera module provided in the depolarization region of the polarizing plate. Transmittance of a visible ray region may be improved, an effect of increasing visibility of a camera lens portion may be secured by positioning the camera module in the depolarization region where the polarization degree is reduced, and an appearance improvement effect may be secured by including the polarizing plate suppressing the sagging phenomenon of the depolarization region.

Hereinafter, the present specification will be described in more detail through the Examples. However, the following Examples are set forth to illustrate the present specification, but the scope of the present specification is not limited thereto.

EXAMPLE 1

The polyvinyl alcohol-based film (Nippon Gohsei Co., Ltd. M3000 grade 30 μm) was subjected to the swelling process in the pure solution at 25° C. for 15 seconds, and then subjected to the dyeing process in the iodine solution having the concentration of 0.2 wt % at 25° C. for 60 seconds. Thereafter, the polyvinyl alcohol-based film was subjected to the washing process in 1 wt % of the boric acid solution at 45° C. for 30 seconds, and the six time elongation process was then performed in 2.5 wt % of the boric acid solution at 52° C. After elongation, the polyvinyl alcohol-based film was subjected to the complementary color process in 5 wt % of the potassium iodide (KI) solution, and then dried in the oven at 60° C. for 5 minutes, thereby manufacturing the polyvinyl alcohol-based polarizer having the thickness of 12 μm.

Thereafter, after the acryl-based protection film was laminated on one surface of the polyvinyl alcohol-based polarizer and the masking film where the hole having the diameter of about 4 mm was processed was laminated on the other surface of the polarizer, the polyethylene terephthalate (PET) release film having tensile strength of about 7500 N was attached onto the acryl-based protection film by using the cohesive agent.

The polyvinyl alcohol-based polarizer where the masking film and the release film were laminated was immersed in 10 wt % of the KOH aqueous solution at 60° C. for 3 seconds to be decolored, immersed in 4 wt % of the boric acid aqueous solution for 5 seconds to be neutralized, and dried in the oven at 60° C. for 30 seconds, the masking film was removed, and then the acryl-based protection film was laminated. Thereafter, the polyethylene terephthalate (PET) film was removed to manufacture the polarizing plate having the structure of the acryl-based protection film/polyvinyl alcohol-based polarizer/acryl-based protection film.

Figure 2A:
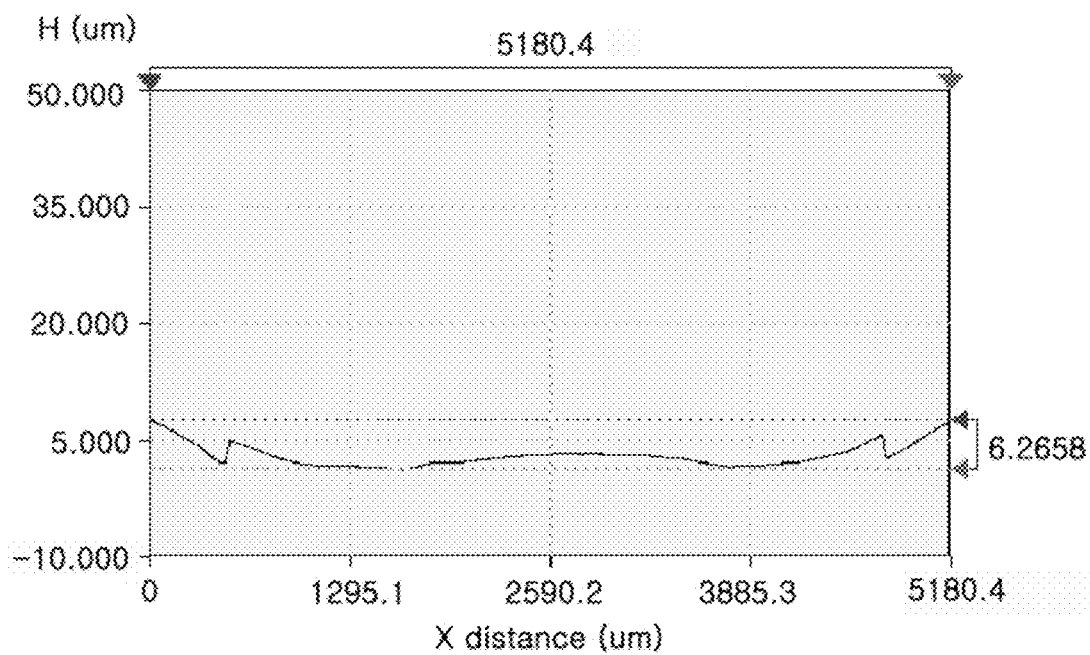
FIG. 2A illustrates a depth of a sagging region obtained by measuring a surface of a depolarization region by using a white light three dimension measuring machine in a polarizing plate according to Example 1.
Figure 2B:
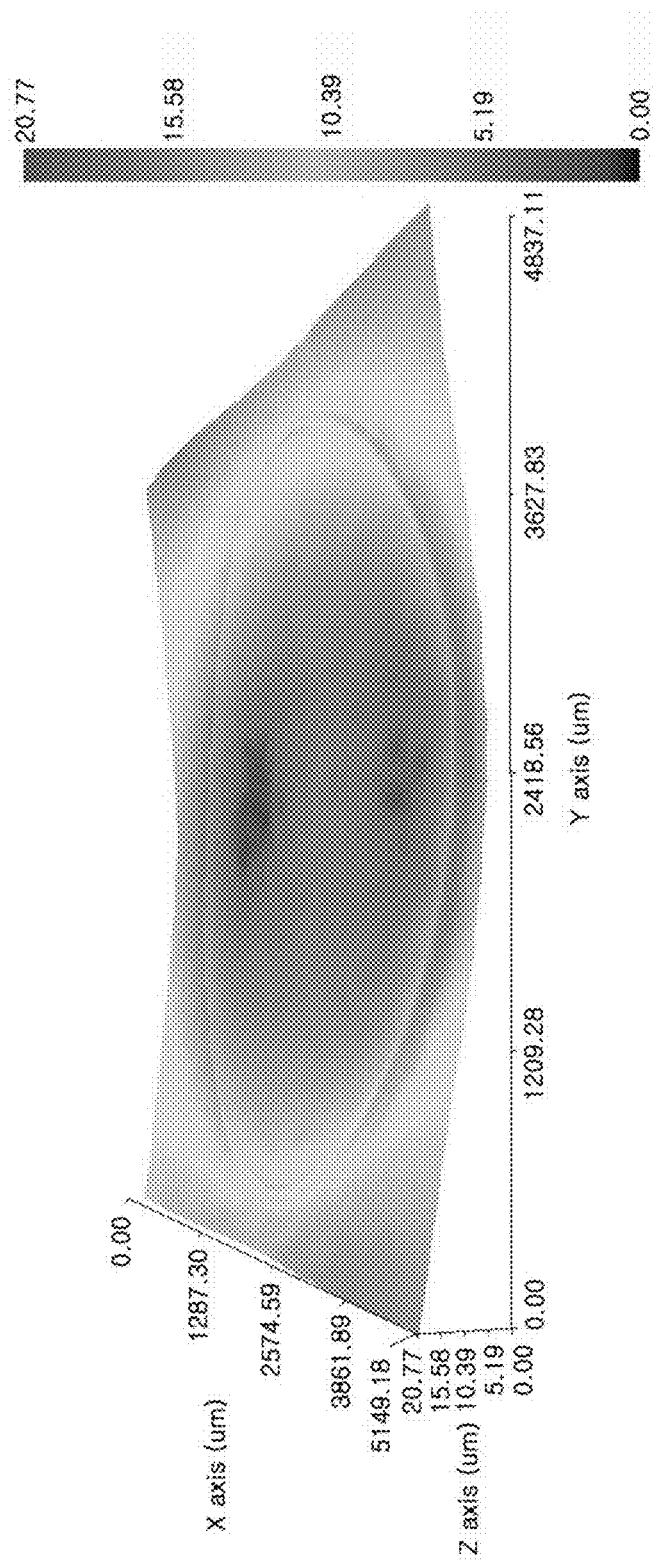
FIG. 2B illustrates a 3D picture obtained by photographing the surface of the depolarization region by using the white light three dimension measuring machine in the polarizing plate according to Example 1.

FIG. 2A illustrates the depth of the sagging region obtained by measuring the surface of the depolarization region by using the white light three dimension measuring machine in the polarizing plate according to Example 1. Further, FIG. 2B illustrates a 3D picture obtained by photographing the surface of the depolarization region by using the white light three dimension measuring machine in the polarizing plate according to Example 1. Specifically, FIG. 2B illustrates that the sagging phenomenon occurs on the surface of the depolarization region, and the maximum sagging depth was about 6 μm.

Comparative Example 1

The polarizing plate having the structure of the acryl-based protection film/polyvinyl alcohol-based polarizer/acryl-based protection film was manufactured by the same manufacturing method as Example 1, except that the polyethylene terephthalate (PET) release film having tensile strength of about 1500 N was attached.

Figure 3A:
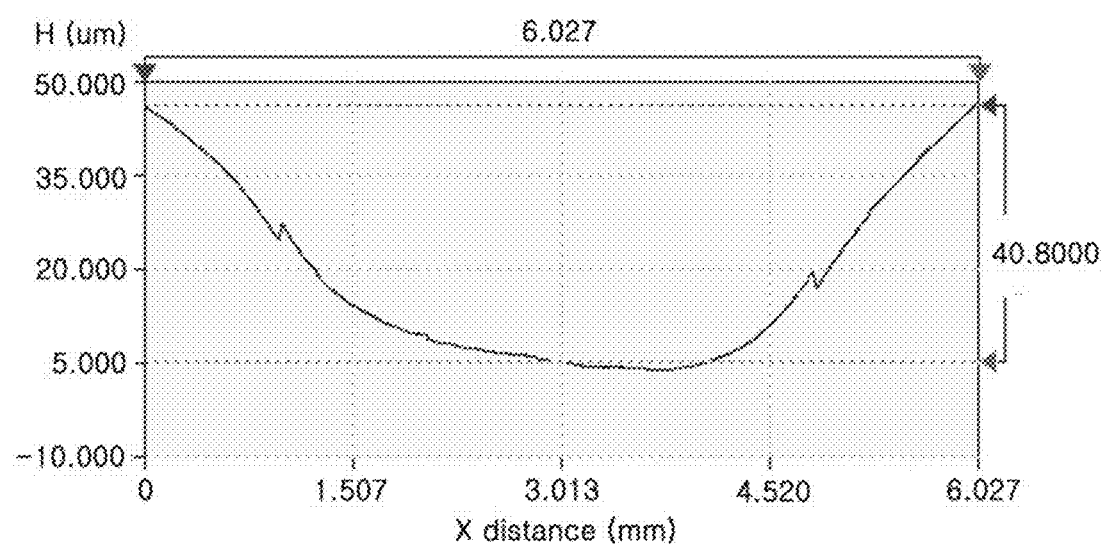
FIG. 3A illustrates a depth of a sagging region obtained by measuring a surface of a depolarization region by using a white light three dimension measuring machine in a polarizing plate according to Comparative Example 1.
Figure 3B:
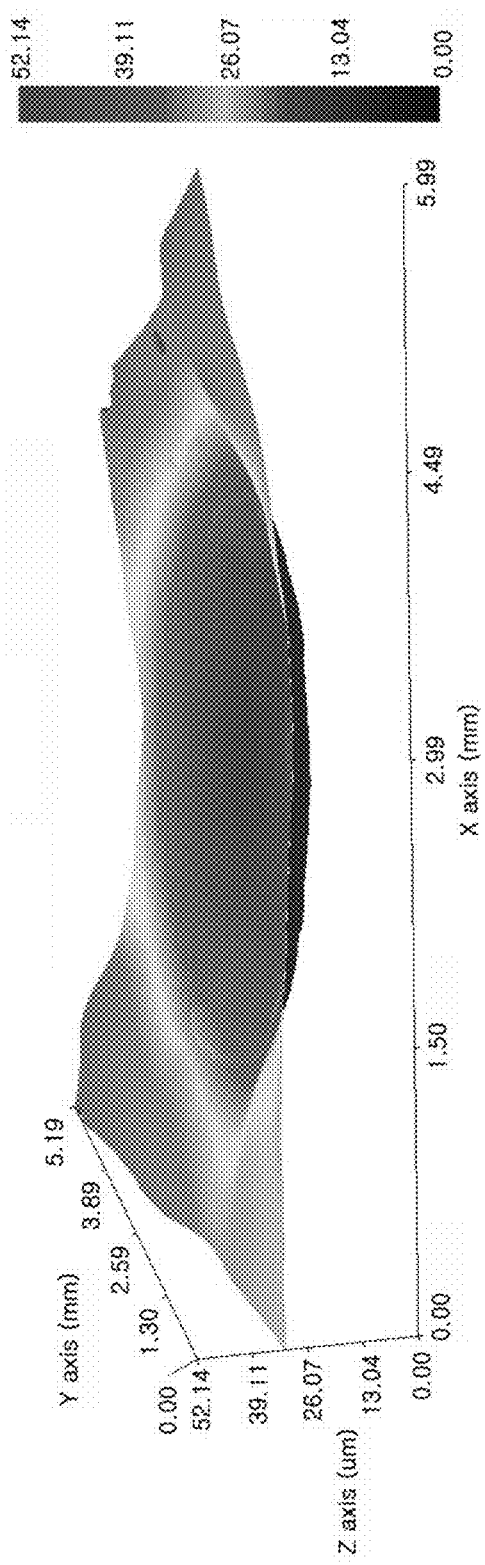
FIG. 3B illustrates a 3D picture obtained by photographing the surface of the depolarization region by using the white light three dimension measuring machine in the polarizing plate according to Comparative Example 1.

FIG. 3A illustrates the depth of the sagging region obtained by measuring the surface of the depolarization region by using the white light three dimension measuring machine in the polarizing plate according to Comparative Example 1. Further, FIG. 3B illustrates a 3D picture obtained by photographing the surface of the depolarization region by using the white light three dimension measuring machine in the polarizing plate according to Comparative Example 1. Specifically, FIG. 3B illustrates that the sagging phenomenon occurs on the surface of the depolarization region, and the maximum sagging depth was about 30 μm.

Comparative Example 2

The polarizing plate having the structure of the acryl-based protection film/polyvinyl alcohol-based polarizer/acryl-based protection film was manufactured by the same manufacturing method as Example 1, except that the polyethylene terephthalate (PET) release film having tensile strength of about 2000 N was attached.

The maximum sagging depth in the depolarization region of the polarizing plate according to Comparative Example 2 was about 20 μm.

Comparative Example 3

The polarizing plate having the structure of the acryl-based protection film/polyvinyl alcohol-based polarizer/acryl-based protection film was manufactured by the same manufacturing method as Example 1, except that the polyethylene terephthalate (PET) release film having tensile strength of about 3000 N was attached.

The maximum sagging depth in the depolarization region of the polarizing plate according to Comparative Example 3 was about 25 μm.

Comparative Example 4

The polarizing plate having the structure of the acryl-based protection film/polyvinyl alcohol-based polarizer/acryl-based protection film was manufactured by the same manufacturing method as Example 1, except that the polyethylene terephthalate (PET) release film having tensile strength of about 5000 N was attached.

The maximum sagging depth in the depolarization region of the polarizing plate according to Comparative Example 4 was about 15 μm.

Figure 4:
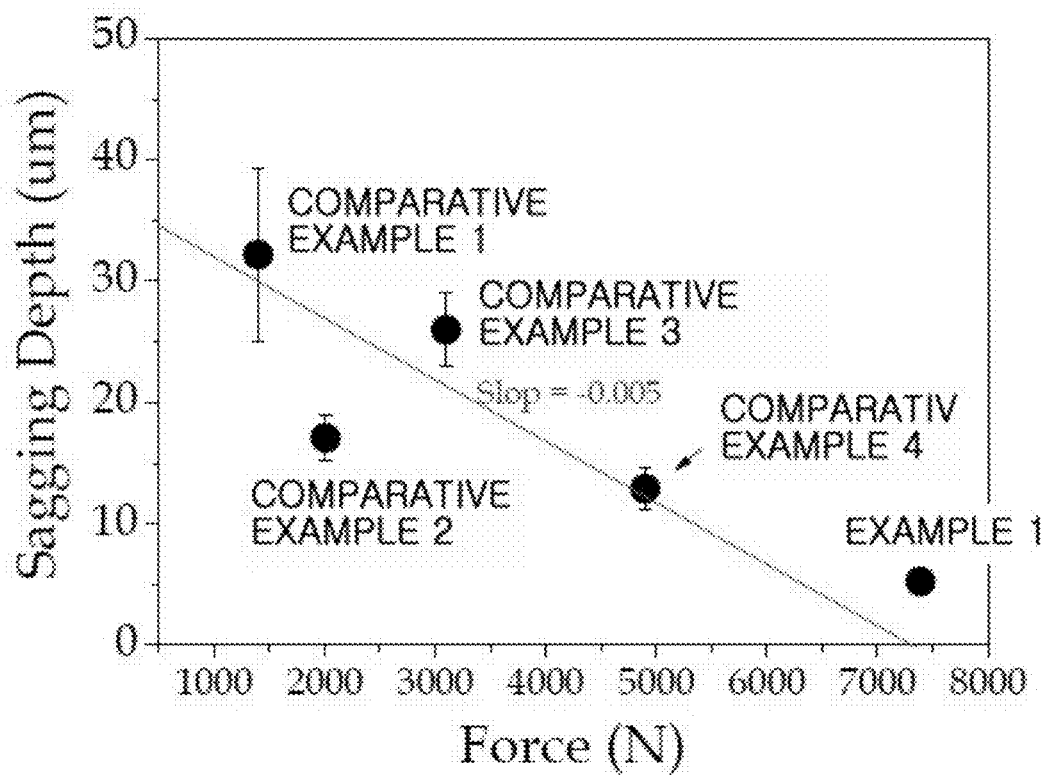
FIG. 4 illustrates maximum sagging depths of the polarizing plates according to the Example and the Comparative Examples.

FIG. 4 illustrates the maximum sagging depths of the polarizing plates according to the Example and the Comparative Examples. In FIG. 4, the x axis means tensile strength of the release film, and the y axis means the maximum sagging depth.

According to the results of the Example and the Comparative Examples, it can be seen that the polarizing plate manufactured by the manufacturing method according to the exemplary embodiment of the present specification may significantly suppress the sagging phenomenon in the depolarization region.

The invention claimed is:

1. A method for manufacturing a polarizing plate, the method comprising:
   providing a polyvinyl alcohol-based polarizer dyed with at least one or more of iodine and dichromatic dyes;
   providing a protection film and a release film on one surface of the polarizer; and
   forming at least one depolarization region by bringing a decoloring solution into local contact with the other surface of the polarizer,
   wherein the release film is provided on a surface of the protection film, which is opposite to a surface facing the polarizer, the depolarization region has single transmittance of 80% or more and a polarization degree of 10% or less at a wavelength band in a range of 400 nm to 800 nm, and a maximum sagging depth of the depolarization region region is 10 μm or less, and
   wherein a haze of the depolarization region is 3% or less, and
   wherein an arithmetic mean roughness Ra of the depolarization region is 200 nm or less.

2. The method of claim 1, wherein the release film has tensile strength of 6000 N or more.

3. The method of claim 1, wherein an area of at least one depolarization region is 0.5 mm² or more and 500 mm² or less.

4. The method of claim 1, wherein the decoloring solution includes one kind or more decolorants selected from the group consisting of sodium hydroxide (NaOH), sodium hydrosulfide (NaSH), sodium azide (NaN₃), potassium hydroxide (KOH), potassium hydrosulfide (KSH), and potassium thiosulfate (KS₂O₃).

5. The method of claim 1, wherein a pH of the decoloring solution is 11 to 14.

6. The method of claim 1, wherein a viscosity of the decoloring solution is 1 cP to 2000 cP.

7. The method of claim 1, wherein the decoloring solution further includes a viscosity agent.

8. The method of claim 7, wherein the decoloring solution includes 1 wt % to 30 wt % of a decolorant; 0.5 wt % to 30 wt % of a viscosity agent; and 40 wt % to 70 wt % of a solvent, based on a total weight, and the solvent is water or a mixture solvent of water and alcohol.

9. The method of claim 1, further comprising:
   before the forming of the depolarization region, forming a mask layer including at least one bored portion on the other surface of the polarizer.

10. The method of claim 9, wherein in the forming of the mask layer, the bored portion is formed in at least one region of a mask film, and the mask film is attached onto the other surface of the polarizer.

11. The method of claim 9, wherein in the forming of the mask layer, a coating layer is formed on the other surface of the polarizer, and at least one region of the coating layer is selectively removed to form the bored portion.

12. The method of claim 1, wherein the forming of the depolarization region is performed by an immersion method, a dispenser method, an inkjet method, or a gravure printing method.

13. The method of claim 1, further comprising:
   after the forming of the depolarization region, performing washing by using alcohol or an acid solution.

14. The method of claim 1, further comprising:
   after the forming of the depolarization region, removing the release film.

15. A polarizing plate comprising:
   a polyvinyl alcohol-based polarizer dyed with at least one or more of iodine and dichromatic dyes; and
   a protection film provided on at least one surface of the polyvinyl alcohol-based polarizer,
   wherein the polyvinyl alcohol-based polarizer has at least one depolarization region, the depolarization region has single transmittance of 80% or more and a polarization degree of 10% or less at a wavelength band in a range of 400 nm to 800 nm, and a maximum sagging depth of the depolarization region is 10 μm or less, and
   wherein a haze of the depolarization region is 3% or less, and
   wherein an arithmetic mean roughness Ra of the depolarization region is 200 nm or less.

16. The polarizing plate of claim 15, wherein an area of at least one depolarization region is 0.5 mm² or more and 500 mm² or less.

17. The polarizing plate of claim 15, wherein a region other than the depolarization region of the polarizing plate has the single transmittance of 40% to 45% and the polarization degree of 99% or more.

18. The polarizing plate of claim 15, wherein in the depolarization region, a content of at least one or more of the iodine and dichromatic dyes is 0.1 wt % to 0.5 wt %, and in the region other than the depolarization region, the content of at least one or more of the iodine and dichromatic dyes is 1 wt % to 4 wt %.

19. An image display comprising:
   a display panel; and
   the polarizing plate according to claim 15 which is attached onto one surface or both surfaces of the display panel.

20. The image display of claim 19, further comprising:
   a camera module provided in a depolarization region of the polarizing plate.

* * * * *